(12) United States Patent
Jacobson et al.

(10) Patent No.: US 6,786,316 B2
(45) Date of Patent: Sep. 7, 2004

(54) ELECTRO-MAGNETIC CLUTCH PULLEY

(75) Inventors: Richard Jacobson, Ann Arbor, MI (US); Russell Monahan, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/185,253

(22) Filed: Jul. 1, 2002

(65) Prior Publication Data

US 2004/0000460 A1 Jan. 1, 2004

(51) Int. Cl.$^7$ ............................................. F16D 13/22
(52) U.S. Cl. ........................ 192/84.961; 192/84.941; 192/84.94
(58) Field of Search ....................... 192/84.92, 84.94, 192/84.96, 84.961, 84.941

(56) References Cited

U.S. PATENT DOCUMENTS

| | | | | | |
|---|---|---|---|---|---|
| 1,523,413 | A | * | 1/1925 | Gent | 192/84.94 |
| 2,407,757 | A | * | 9/1946 | MacCallum | 192/84.94 |
| 2,724,474 | A | * | 11/1955 | Hupp | 192/84 |
| 2,751,056 | A | * | 6/1956 | Aumuller et al. | 192/84.94 |
| 3,162,285 | A | * | 12/1964 | Sala | 192/84.94 |
| 3,310,141 | A | * | 3/1967 | Smirl | 192/84.94 |
| 3,429,409 | A | * | 2/1969 | Leblanc | 192/84.94 |
| 3,620,339 | A | * | 11/1971 | Becking et al. | 192/84.94 |
| 3,650,362 | A | * | 3/1972 | Davidson | 192/84 |
| 3,788,099 | A | * | 1/1974 | Miller | 464/98 |
| 3,917,042 | A | * | 11/1975 | Summa | 192/84 |
| 4,010,832 | A | * | 3/1977 | Puro | 192/84 |
| 4,337,855 | A | * | 7/1982 | Bennett | 192/84.94 |
| 4,353,450 | A | * | 10/1982 | Wakefield | 192/84.94 |
| 4,624,354 | A | * | 11/1986 | Koitabashi | 192/84.941 |
| 4,744,449 | A | * | 5/1988 | Sekella et al. | 192/84.941 |
| 4,828,090 | A | * | 5/1989 | Matsushita | 192/84.941 |
| 5,119,915 | A | * | 6/1992 | Nelson | 192/894.91 |
| 5,138,293 | A | * | 8/1992 | Ishimaru | 192/84.94 |
| 5,377,799 | A | * | 1/1995 | Mullaney | 192/84.94 |
| 5,931,274 | A | * | 8/1999 | Sakurai et al. | 192/84.961 |
| 6,209,699 | B1 | * | 4/2001 | Hayashi et al. | 192/84.941 |
| 6,286,650 | B1 | * | 9/2001 | Tabuchi et al. | 192/84.94 |

* cited by examiner

*Primary Examiner*—Charles A. Marmor
*Assistant Examiner*—Eric M. Williams
(74) *Attorney, Agent, or Firm*—Brinks Hofer Gilson & Lione

(57) ABSTRACT

A clutch pulley for selectively engaging a belt of a first device and a shaft of a second device, including a sheave member, an electromagnetic coil, a flex plate, and a ring member. The sheave member includes a sheave belt surface adapted to engage the belt and a sheave clutch surface. The electromagnetic coil is adapted to selectively create an electromagnetic flux. The flex plate includes a flex inner section concentrically coupled over the shaft, a flex outer section adapted to selectively move between two axial positions relative to the flex inner section based upon the presence of the electromagnetic flux, and a flex spoke section connecting the flex inner section and the flex outer section. The ring member is connected to the flex outer section and includes a ring clutch surface adapted to selectively engage the sheave clutch surface based upon the axial position of the flex outer section.

20 Claims, 6 Drawing Sheets

ELECTRO-MAGNETIC CLUTCH PULLEY

BACKGROUND

During the operation of an automotive engine, a drive belt is typically used to power and operate various devices. One of these devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various devices (the "input device"). Most conventional driven pulleys are made from a one-piece design with no clutch capabilities. In other words, the conventional driven pulleys are rigidly mounted to the input shaft and are incapable of disengagement. In certain situations, however, there is a need for a selective engagement between the belt of the output device and the shaft of the input device.

DESCRIPTION OF THE PREFERRED EMBODIMENTS

The following description of the preferred embodiments of the invention is not intended to limit the scope of this invention to these preferred embodiments, but rather to enable any person skilled in the art of clutch pulleys to make and use this invention.

Figure 1:
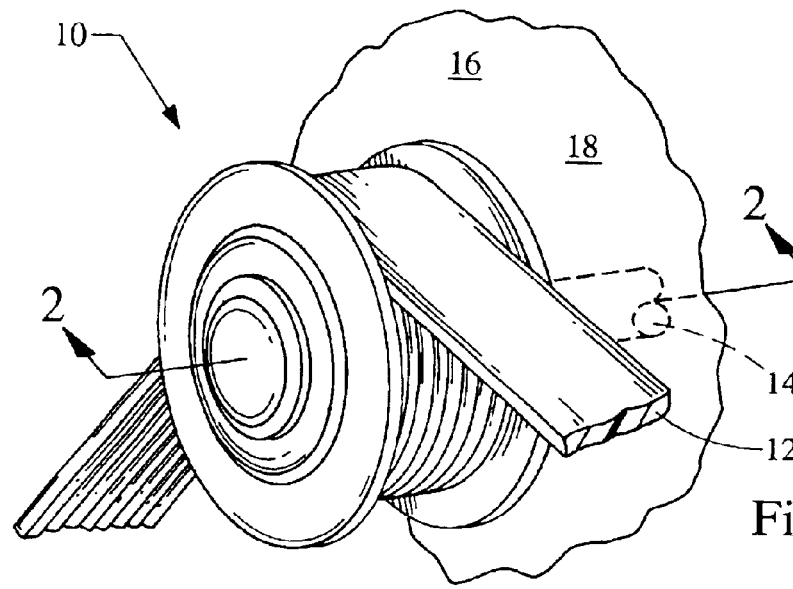
FIG. 1 is a perspective view of an electromagnetic clutch pulley of the first preferred embodiment of the invention, shown with a drive belt as a first device and a cylindrical shaft as a second device.

As shown in FIG. 1, the invention includes a clutch pulley 10 for selectively engaging a belt 12 of a first device (not shown) and a shaft 14 of a second device 16. The clutch pulley 10 has been specifically designed for a hybrid vehicle with an internal combustion engine as the first device and a starter-generator 18 as the second device 16. The clutch pulley 10 may be used, however, in other suitable environments, with other suitable first devices, and with other suitable second devices. Furthermore, instead of selectively engaging a belt 12 and a shaft 14, the clutch pulley 10 may selectively engage chains, gears, or other suitable devices.

Figure 2A:
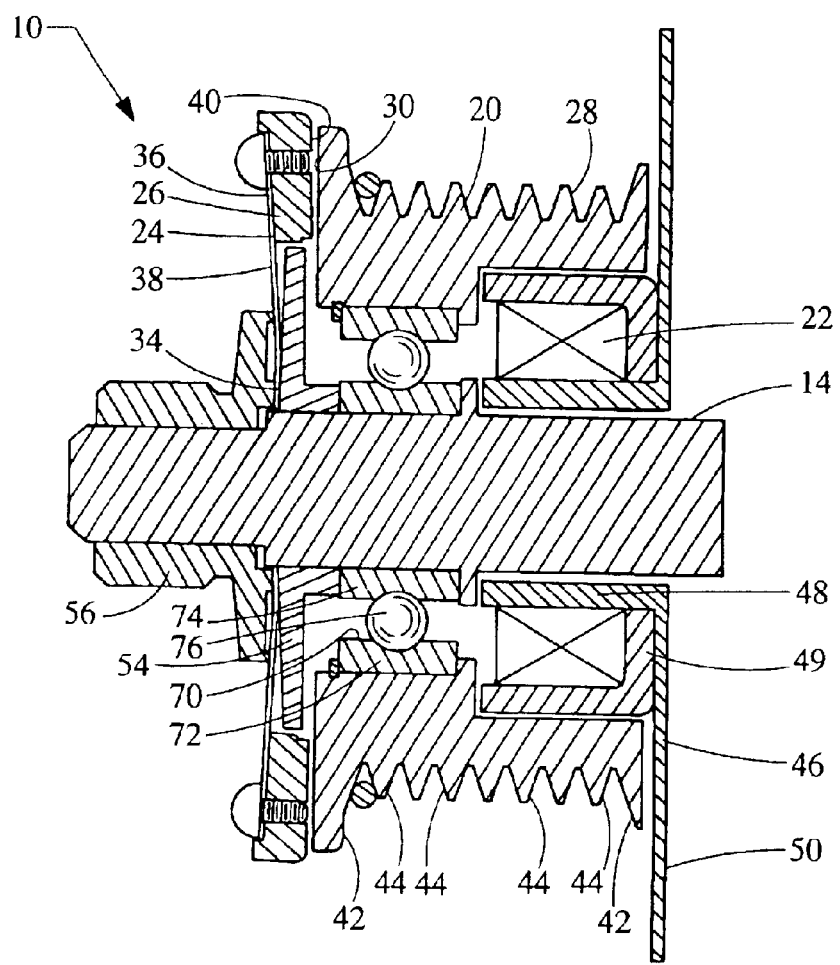
FIGS. 2A and 2B are cross-sectional views, taken along the line 2—2 of FIG. 1, of the electromagnetic clutch pulley of the first preferred embodiment of the invention, shown in a disengaged position and an engaged position, respectively.

As shown in FIG. 2A, the clutch pulley 10 of the preferred embodiment includes a sheave member 20, an electromagnetic coil 22, a flex plate 24, and a ring member 26. The sheave member 20 includes a sheave belt surface 28 adapted to engage the belt of the first device and a sheave clutch surface 30. The electro-magnetic coil 22 is adapted to selectively create an electromagnetic flux 32 (shown in FIG. 2B). The flex plate 24 includes a flex inner section 34 concentrically coupled over the shaft 14 of the second device, a flex outer section 36 adapted to selectively move between two axial positions relative to the flex inner section 34 based upon the presence of the electromagnetic flux, and a flex spoke section 38 connecting the flex inner section 34 and the flex outer section 36. The ring member 26 is connected to the flex outer section 36 and includes a ring clutch surface 40 adapted to selectively engage the sheave clutch surface 30 based upon the axial position of the flex outer section 36. Because torque is transferred from the belt of the first device, through the sheave member 20, through the ring member 26, through the flex plate 24, and into the shaft 14 of the second device, without the use of conventional splines or keys, the clutch pulley 10 of the invention may be made lighter and cheaper than conventional clutch pulleys in the art.

The sheave belt surface 28 of the sheave member 20 of the preferred embodiment functions to engage the belt of the first device. To substantially prevent rotational and axial slippage of the sheave belt surface 28 and the belt 12, the sheave belt surface 28 preferably defines two sheave shoulders 42 and several sheave grooves 44. The sheave belt surface 28 may alternatively define other suitable surfaces, such as toothed surfaces or ribbed surfaces, to engage the belt 12 of the first device. The sheave belt surface 28 is preferably outwardly directed (away from the rotational axis of the clutch pulley 10) and is preferably substantially cylindrically shaped. The sheave belt surface 28 is preferably made from conventional structural materials, such as steel, but may alternatively be made from other suitable materials.

Figure 5:
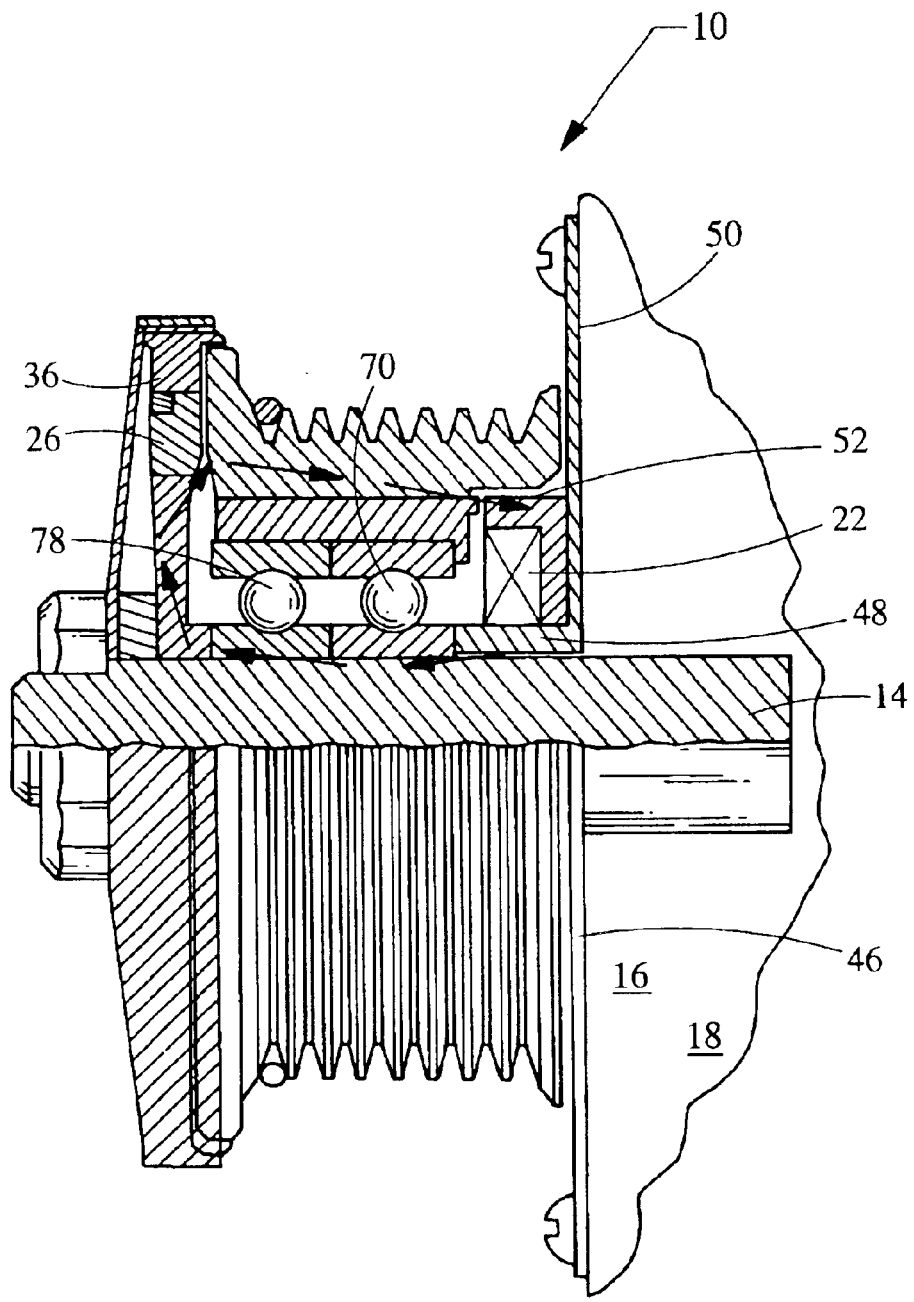
FIG. 5 is a partial cross-sectional view and partial elevation view of an electromagnetic clutch pulley of the invention, shown with alternative aspects of the invention.

The preferred embodiment of the clutch pulleys also includes a coil housing 49 and a mounting plate 46, which cooperatively function to mount the electro-magnetic coil 22 to the second device. Preferably, the mounting plate 46 includes a mounting cylindrical surface 48 that extends over a portion of the shaft 14 and a mounting ring surface 50 that extends over an exterior surface of the second device. The electro-magnetic coil 22 is preferably press-fit mounted between the coil housing 49 (radially outward of the electro-magnetic coil 22) and the mounting cylindrical surface 48 (radially inward of the electro-magnetic coil 22), while the mounting ring surface 50 is preferably fastened to the exterior surface of the second device with bolts, adhesives, or other suitable devices or methods. Alternatively, the electro-magnetic coil 22 may be press-fit mounted radially outward of a modified coil housing (not shown) and radially inward of a modified mounting plated (not shown). Further, as shown in FIG. 5, the mounting plate 46 may include a mounting flange 52, which cooperates with the mounting cylindrical surface 48 and the mounting ring surface 50 to allow mounting of the electro-magnetic coil 22 to the mounting plate 46, while eliminating the need for a separate coil housing. The coil housing 49 and the mounting plate 46 are preferably made from conventional structural materials, such as steel, but may alternatively be made from other suitable materials.

Figure 2B:
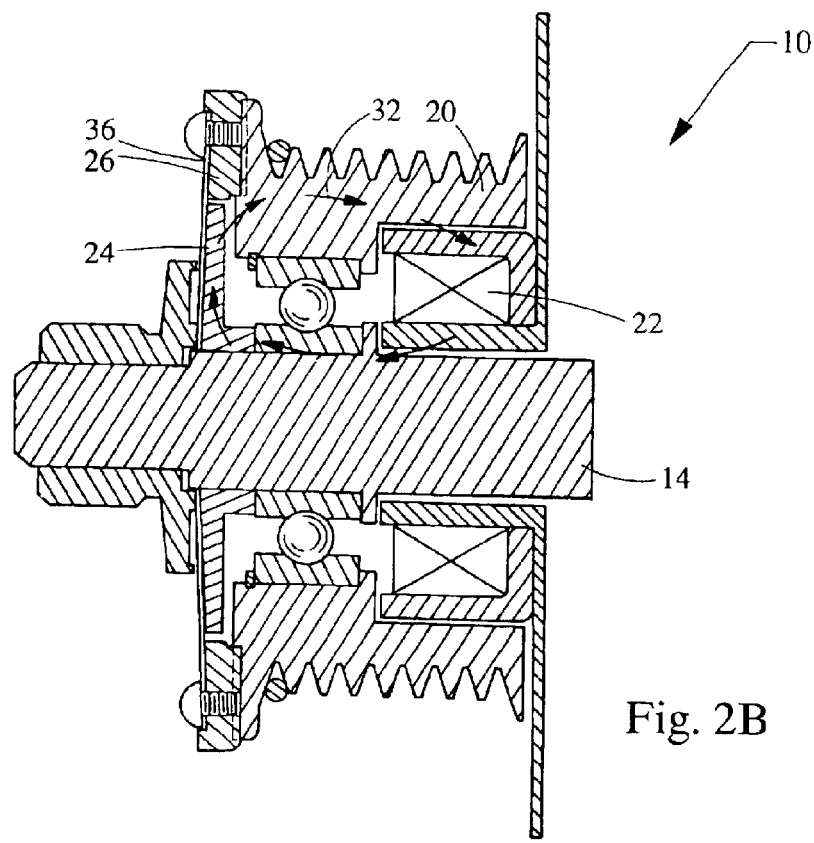

As shown in FIGS. 2A and 2B, the electromagnetic coil 22 of the preferred embodiment functions to selectively create an electromagnetic flux 32 sufficient to move the flex outer section 36 from a first axial position (shown in FIG. 2A) to a second axial position (shown in FIG. 2B). The electromagnetic coil 22 is preferably located concentrically within the sheave member 20, but may alternatively be located in any suitable position. The electromagnetic coil 22 is preferably powered by a suitable device, such as a conventional battery (not shown), and controlled by a suitable device, such as a conventional electronic control module (not shown). The electromagnetic coil 22, however, may be alternatively powered or controlled by any suitable device. The electromagnetic coil 22 is preferably a conventional device, but may alternatively be any suitable device able to create a sufficient electromagnetic flux.

As shown in FIG. 2A, the flex plate 24 of the preferred embodiment functions to selectively engage the ring clutch surface 40 of the ring member 26 and the sheave clutch surface 30 of the sheave member 20. The flex inner section 34 of the flex plate 24, which preferably defines a substantially continuous circular shape, is preferably concentrically mounted to the shaft 14 of the second device with the use of a support member 54 and a fastener 56. Both the support member 54 and the fastener 56 are preferably adapted to be concentrically located over the shaft 14. The fastener 56 is also preferably adapted to axially engage the shaft 14 through the use of conventional threads or other suitable devices or methods. In the preferred embodiment, the flex inner section 34 is concentrically mounted to the shaft 14 by being frictionally engaged between the support member 54 and the fastener 56. In alternative embodiments (as discussed below), the flex inner section 34 may be coupled to the shaft 14 by other suitable devices and methods.

In addition to cooperating with the fastener 56 to mount the flex inner section 34 to the shaft 14, the support member 54 also functions to carry the flux of the electro-magnetic flux 32. The electro-magnetic flux 32 preferably travels from the coil housing 49, through the shaft 14, through the support member 54, through the ring member 26, through the sheave member 20, and back into the coil housing 49. The electromagnetic flux 32 may alternatively travel through other suitable paths to move the flex outer section 36, since the exact properties of the electro-magnetic flux 32 created by the electro-magnetic coil 22 depend on, amongst other things, the material, the size, and the position of the individual parts of the clutch pulley 10.

The flex outer section 36 of the flex plate 24, which also preferably defines a substantially continuous circular shape, functions to selectively move between two axial positions relative to the flex inner section 34 based upon the presence of the electromagnetic flux 32. The flex outer section 36, which is located radially outward from the flex inner section 34, is selectively moveable between a first axial position and a second axial position (shown in FIG. 2B) based upon the presence of the electro-magnetic flux created by the electromagnetic coil 22. The flex outer section 36 is preferably fastened to the ring member 26 with conventional bolts, but may alternatively be fastened to the ring member 26 with a crimping process (shown in FIG. 5), an adhesive (not shown), or any other suitable device or method.

In the preferred embodiment of the invention, the flex plate 24 is a bistable compliant mechanism. A conventional bistable compliant mechanism, such as a light switch, experiences an instable equilibrium during a deflection within a motion range and experiences a stable equilibrium in two discrete positions. The flex plate 24, likewise, preferably experiences an instable equilibrium during a deflection of the flex outer section 36 relative to the flex inner section 34 and experiences a stable equilibrium in the first axial position (shown in FIG. 2A) and in the second axial position (shown in FIG. 2B). In alternative embodiments of the invention, the flex plate 24 may be another suitable mechanism.

Figure 2C:
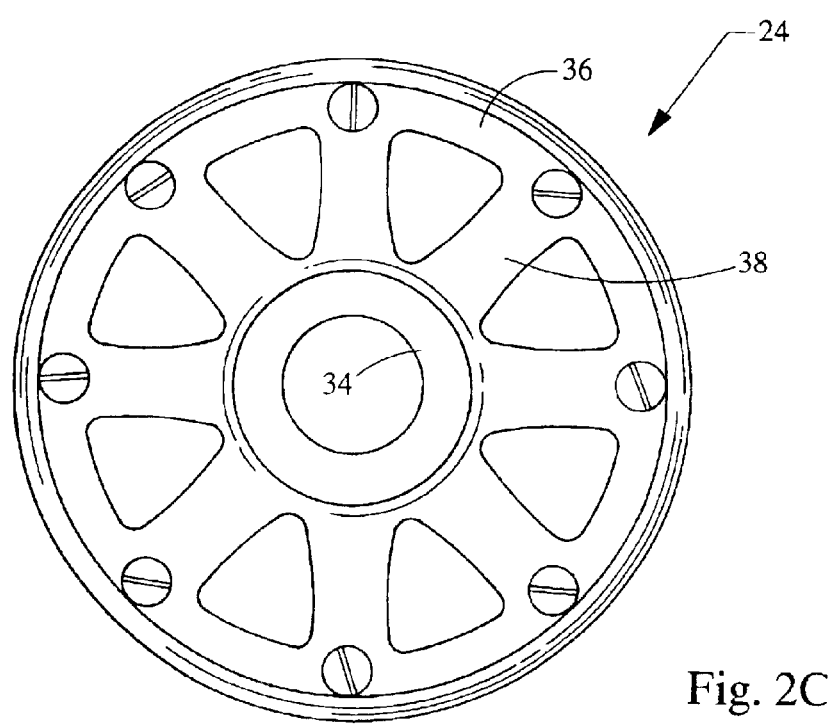
FIG. 2C is a side view of the flex plate of the first preferred embodiment of the invention.

As shown in FIG. 2C, the flex spoke section 38 of the flex plate 24, which connects the flex inner section 34 and the flex outer section 36, functions to transfer torque between the flex inner section 34 and the flex outer section 36 and to allow significant axial movement of the flex outer section 36 relative to the flex inner section 34. In the preferred embodiment, the flex spoke section 38 includes eight discrete spokes. In alternative embodiments, the flex spoke section 38 may include any suitable number of discrete spokes. The flex inner section 34, the flex spoke section 38, and the flex outer section 36 are preferably integrally and uniformly formed, but may alternatively be separately formed and later fastened together with welding techniques, adhesive techniques, or other suitable devices or methods. The flex plate 24 is preferably made from conventional structural materials, such as aluminum or tin, but may alternatively be made from other suitable materials that allow significant torque transfer between the ring member and the shaft 14 and allow significant axial displacement of the flex outer section 36.

Figure 3A:
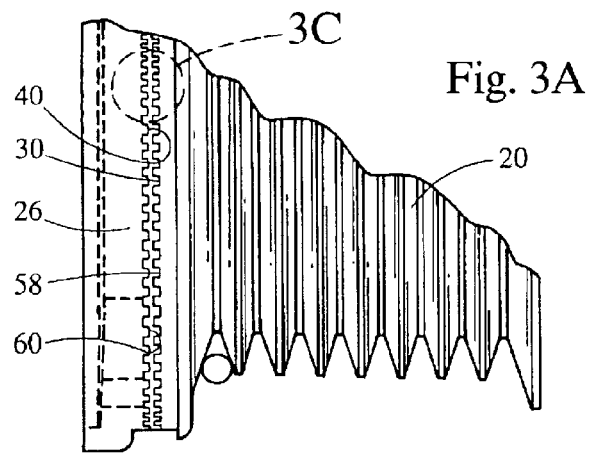
FIG. 3A is a partial view of the sheave member and the ring member of the first preferred embodiment of the invention.
Figure 3B:
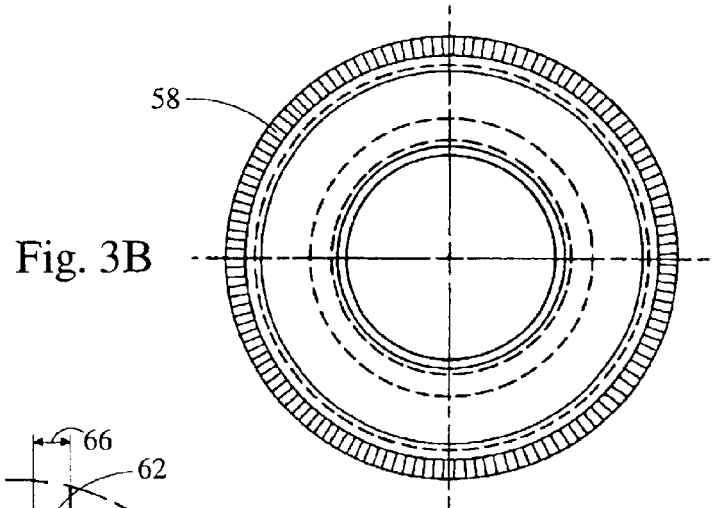
FIG. 3B is a side view of the sheave member of the first preferred embodiment of the invention.
Figure 3C:
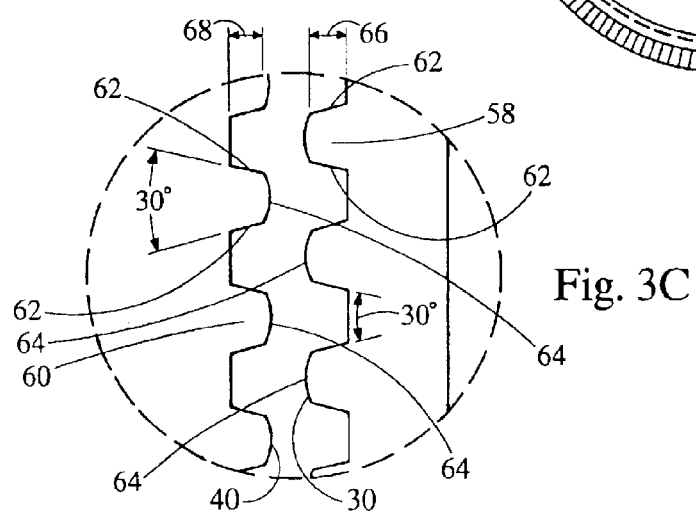
FIG. 3C is a detailed view of the sheave clutch teeth and the ring clutch teeth of the first preferred embodiment of the invention.

As shown in FIG. 3A, the ring clutch surface 40 of the ring member 26 of the preferred embodiment functions to selectively engage the sheave clutch surface 30 of the sheave member 20 based upon the axial position of the flex outer section. In the preferred embodiment, the sheave clutch surface 30 defines sheave clutch teeth 58 protruding in an axial direction toward the ring clutch surface 40, while the ring clutch surface 40 defines ring clutch teeth 60 protruding in an axial direction toward the sheave clutch surface 30. As shown in FIG. 3B, the sheave clutch teeth 58 preferably extend in a radial direction. Although not shown, the ring clutch teeth also preferably extend in a radial direction. As shown in FIG. 3C, both the sheave clutch teeth 58 and the ring clutch teeth 60 individually define opposing side walls 62. The opposing side walls 62 are preferably angled at approximately 30° to each other, which is the "angle of repose" for the frictional engagement of steel-on-steel (carbonitrided or carburized steel is the preferred material for the ring clutch surface 40 and the sheave clutch surface 30). The sheave clutch teeth 58 preferably define a rounded top wall 64, which functions to "push off" the ring clutch surface 40 if the sheave member 20 and the ring member 26 are not rotating at similar speeds. The ring clutch teeth 60 also preferably define a rounded top wall 64, which similarly functions to preferably "push off" the sheave clutch surface 30. The sheave clutch teeth 58 preferably define a sheave tooth height 66 of approximately 0.017 inches, while the ring clutch teeth 60 preferably define a ring tooth height 68 of approximately 0.015 inches. This sufficient difference between the sheave tooth height 66 and the ring tooth height 68 allows easy disengagement of the sheave clutch surface 30 and the ring clutch surface 40. In alternative embodiments, the ring clutch surface 40 and the sheave clutch surface 30 may define or include other suitable elements to allow selective rotational engagement.

As shown in FIG. 2A, the clutch pulley 10 of the preferred embodiment also includes a bearing member 70, which functions to allow relative rotational movement between the shaft 14 and the sheave member 20. The bearing member 70 is preferably concentrically mounted within the sheave member 20 and concentrically mounted over the shaft 14. The bearing member 70, which is a roller element type, preferably includes an outer race element 72 preferably press-fit mounted within the sheave member 20, an inner race element 74 preferably press-fit mounted over the shaft 14, and ball bearing elements 76 preferably located between the outer race element 72 and the inner race element 74. The bearing member 70 may alternatively include bearing seals (not shown) extending between the outer race element 72 and the inner race element 74 on either side of the ball bearing elements 76. The bearing member 70 may be alternatively be of other suitable types, such as a journal bearing or a roller bearing, may alternatively include other suitable elements, and may alternatively be mounted in other suitable manners. Further, the clutch pulley 10 may include a second bearing member 78 (shown in FIG. 5) or any number of bearing members in any suitable location. The bearing member 70 is preferably a conventional device, but may alternatively be any suitable device that allows relative rotational movement between the shaft 14 and the sheave member 20.

Figures 4A, 4B:
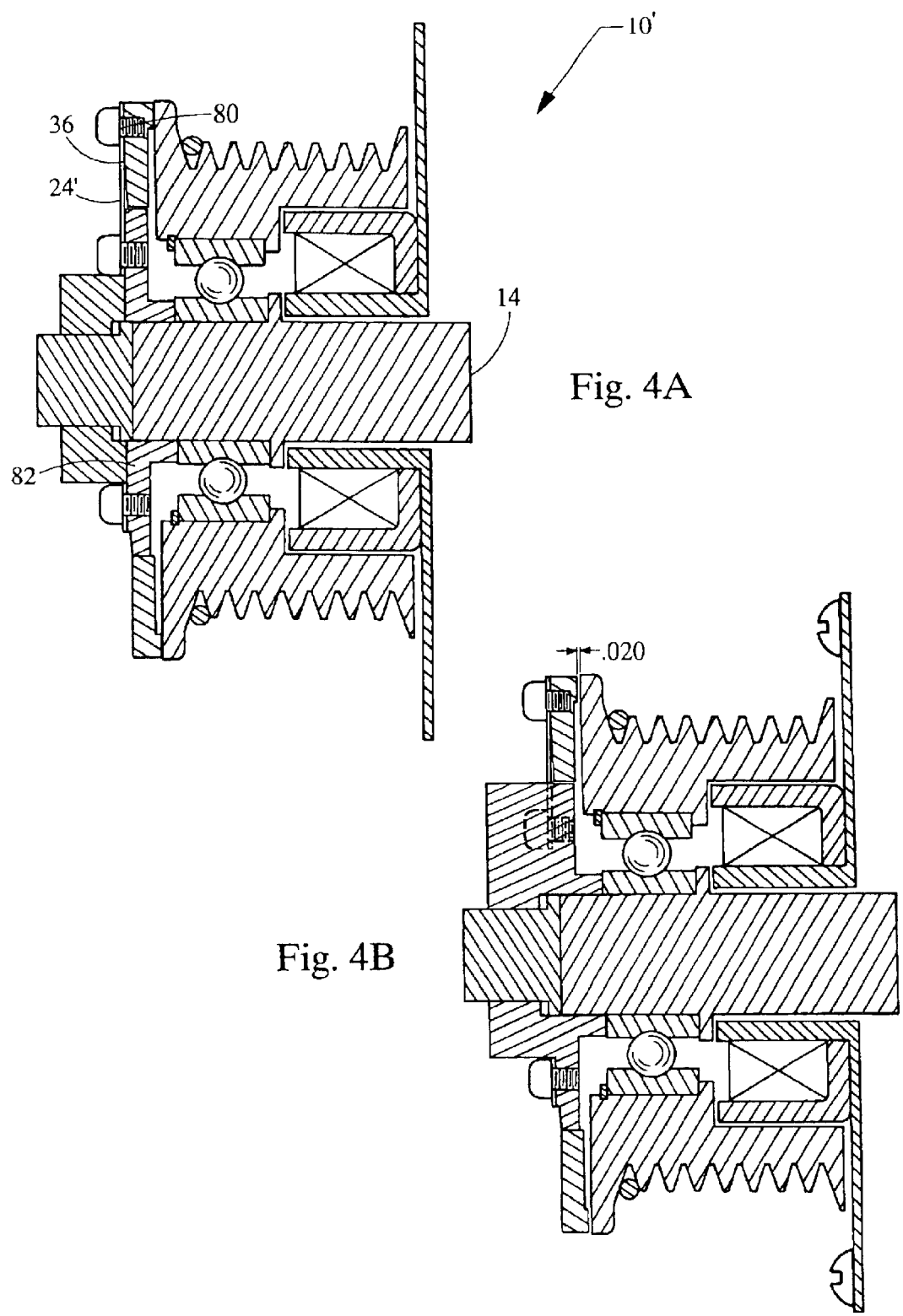
FIGS. 4A and 4B are cross-sectional views, taken along the line 2—2 of FIG. 1, of the electro-magnetic clutch pulley of the second preferred embodiment of the invention, shown in an engaged position and a disengaged position, respectively.
Figure 4C:
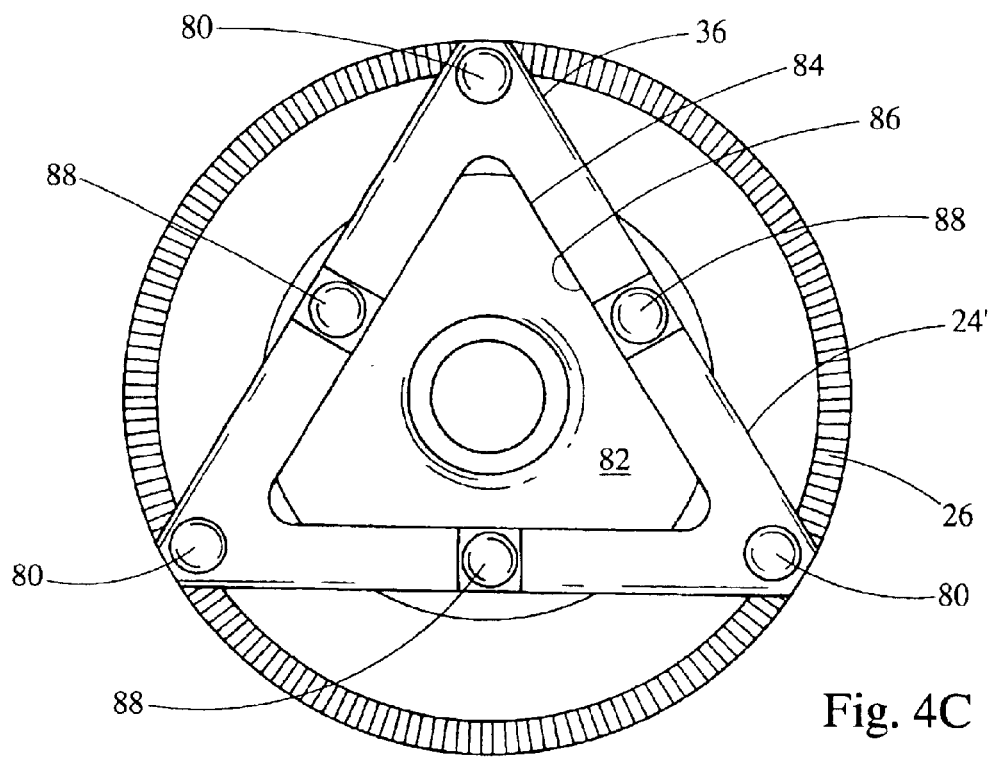
FIG. 4C is a side view of the flex plate of the second preferred embodiment of the invention.
Figure 4D:
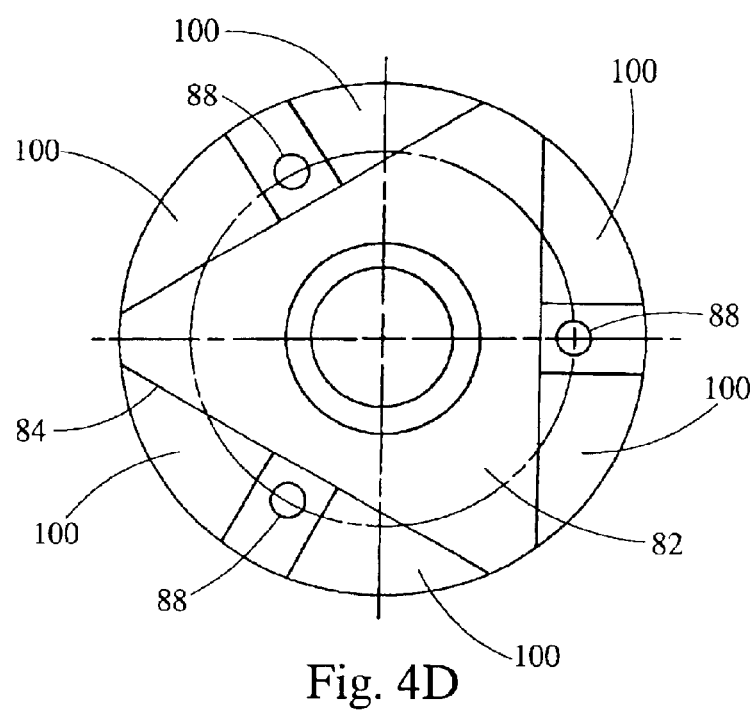
FIGS. 4D and 4E are views of the torque transfer member of the second preferred embodiment of the invention.
Figure 4E:
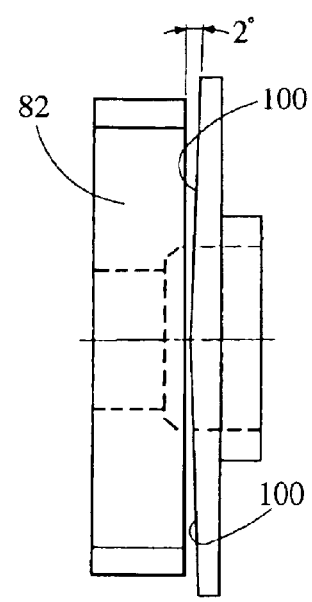

As shown in FIGS. 4A and 4C, the clutch pulley 10' of the second preferred embodiment includes a modified flex plate 24'. The flex outer section 36 of the modified flex plate 24' preferably defines three discrete outer points 80, which function as connection points to the ring member 26. The clutch pulley 10' of the second preferred embodiment also includes a torque transfer member 82, which is preferably concentrically located over the shaft. The torque transfer member 82, which functions to transfer torque between the modified flex plate 24' and the shaft 14 and functions to carry the electromagnetic flux 32 (like the support member of the first preferred embodiment), has a transfer exterior surface 84 that defines a noncircular shape, as shown in FIGS. 4C and 4D. The transfer exterior surface 84 is preferably a substantially triangular shape. The modified flex plate 24' preferably has a flex interior surface 86 adapted to concentrically mate and rotationally engage with the transfer exterior surface 84. The flex interior surface 86 is preferably a substantially triangular shape, but may alternatively be other suitable non-circular shapes that allow significant mating and torque transferring functions. With other suitable non-circular shapes, the flex outer section 36 of the modified flex plate 24' may define more than three discrete outer points 80. The flex inner section 34 preferably defines three discrete inner points 88. The flex inner section 34 is preferably fastened to the torque transfer member 82 at these three discrete inner points 88 with conventional bolts or other suitable devices or methods. The torque transfer member 82 preferably includes sloped surfaces 100 with a 2 degree slope that allow axial movement of the flex outer section 36, as shown in FIGS. 4D and 4E. In all other respects, the clutch pulley 10' of the second preferred embodiment is preferably identical to the clutch pulley of the first preferred embodiment.

Unless otherwise noted, the parts of the clutch pulley 10 are preferably made with conventional methods, but may alternatively be made with other suitable methods.

As any person skilled in the art of clutch pulleys will recognize from the previous detailed description and from the figures and claims, modifications and changes can be made to the preferred embodiments of the invention without departing from the scope of this invention defined in the following claims.

We claim:

1. A clutch pulley for selectively engaging a belt of a first device and a shaft of a second device, comprising:
    a sheave member including a sheave belt surface to engaging the belt, and including a sheave clutch surface;
    an electro-magnetic coil located near said sheave member and to selectively creating an electro-magnetic flux;
    a flex plate including a flex inner section concentrically coupled over the shaft, a flex outer section adapted to selectively move between two axial positions relative to said flex inner section based upon the presence of said electro-magnetic flux, and a flex spoke section connecting said flex inner section and said flex outer section;
    a support member connected to said shaft and said flex plate, said support member adapted to carry the electromagnetic flux; and
    a ring member connected to said flex outer section and including a ring clutch surface selectively engaging said sheave clutch surface based upon the axial position of said flex outer section.

2. The invention of claim 1 wherein said flex plate; said ring member, and said sheave member are formed from a metallic material.

3. The invention of claim 1 further comprising a mounting plate adapted to be fastened to the second device; said electro-magnetic coil being mounted to said mounting plate.

4. The invention of claim 1 further comprising a bearing member concentrically mounted within said sheave member and adapted to be concentrically mounted over the shaft and to allow relative rotational movement between the shaft and said sheave member.

5. The invention of claim 1 wherein said flex inner section and said flex outer section each define substantially continuous circular shapes.

6. The invention of claim 1 further comprising a fastener adapted to be concentrically located over the shaft and axially engaged with the shaft; said flex inner section being frictionally engaged between said support member and said fastener.

7. The invention of claim 1,
    wherein said electro-magnetic flux travels in an electro-magnetic loop, said electro-magnetic loop including said electro-magnetic coil, said shaft, said support member, said ring member, and said sheave.

8. The invention of claim 1, wherein said flex plate member is a bistable compliant mechanism having a first equilibrium with said plate outer edge in the first axial position and having a second equilibrium with said plate outer edge in the second axial position.

9. The invention of claim 1 wherein said sheave clutch teeth and said ring clutch teeth individually define opposing side walls angled at approximately 30° to each other.

10. The invention of claim 9 wh rein said sheave clutch teeth define a median sheave tooth height and said ring clutch teeth define a median ring tooth height; and said median sheave tooth height and said median ring tooth height being sufficiently different to ease disengagement of said sheave clutch surface and said ring clutch surface.

11. The invention of claim 10 wherein said sheave clutch teeth and said ring clutch teeth individually define a rounded top wall.

12. A crutch pulley for selectively engaging a belt of a first device and a shaft of a second device, comprising:

a sheave member including a sheave belt surface engaging the belt, and including a sheave clutch surface;

an electro-magnetic coil located near said sheave member and selectively creating electro-magnetic flux;

a flex plate including a flex inner section concentrically coupled over the shaft, a flex outer section adapted to selectively move between two axial positions relative to said flex inner section based upon the presence of said electro-magnetic flux, and a flex spoke section connecting said flex inner section and said flex outer section;

a ring member connected to said flex outer section and including a ring clutch surface adapted to selectively engage said sheave clutch surface based upon the axial position of said flex outer section; and a torque transfer member connected to and concentrically located over the shaft and having a transfer exterior surface defining a non-circular shape, said torque transfer member further adapted to carry the electro-magnetic flux; said flex plate having a flex interior surface concentrically mating rotationally engaging with said transfer exterior surface.

13. The invention of claim 12 wherein said flex outer section defines three discrete outer points; said ring member being coupled to said flex outer section at said three discrete outer points.

14. The invention of claim 12 wherein said transfer exterior surface defines a substantially triangular shape.

15. The invention of claim 12 wherein said flex inner section defines three discrete inner points; said flux inner section being fastened to said torque transfer member at said three discrete inner points.

16. The invention of claim 12 wherein said torque transfer member includes sloped surfaces adapted to allow axial movement of said flex outer section.

17. The invention of claim 12, wherein said flex plate member is a bistable compliant mechanism having a first equilibrium with said plate outer edge in the first axial position and having a second equilibrium with said plate outer edge in the second axial position.

18. The invention of claim 12 wherein said sheave clutch teeth and said ring clutch teeth individually define opposing side walls angled at approximately 30° to each other.

19. The invention of claim 18 wherein said sheave clutch teeth define a median sheave tooth height and said ring clutch teeth define a median ring tooth height: and said median sheave tooth height and said median ring tooth height being sufficiently different to ease disengagement of said sheave clutch surface and said ring clutch surface.

20. The invention of claim 19 wherein said sheave clutch teeth and said ring clutch teeth individually define a rounded top wall.

* * * * *

UNITED STATES PATENT AND TRADEMARK OFFICE
CERTIFICATE OF CORRECTION

PATENT NO. : 6,786,316 B2
DATED : September 7, 2004
INVENTOR(S) : Richard Jacobson et al.

It is certified that error appears in the above-identified patent and that said Letters Patent is hereby corrected as shown below:

Title page,
Item [57], ABSTRACT,
Lines 3, 6, 7 and 11, delete "electromagnetic" and substitute -- electro-magnetic -- in its place (all occurrences).

Column 6,
Line 8, after "belt surface" delete "to".
Line 12, before "selectively" delete "to".
Line 27, immediately after "flex plate" delete ";" (semicolon) and substitute -- , -- (comma) in its place.
Line 59, before "said sheave" delete "wh rein" and substitute -- wherein -- in its palce.

Column 7,
Line 24, after "mating" insert -- and --.

Column 8,
Line 18, immediately after "height" delete ":" (colon) and substitute -- ; -- (semicolon) in its place.

Signed and Sealed this

Sixteenth Day of August, 2005

JON W. DUDAS
*Director of the United States Patent and Trademark Office*